(12) United States Patent
Pan et al.

(10) Patent No.: US 12,236,685 B2
(45) Date of Patent: Feb. 25, 2025

(54) PEDESTRIAN SEARCH METHOD, SERVER, AND STORAGE MEDIUM

(71) Applicant: ZTE CORPORATION, Shenzhen (CN)

(72) Inventors: Yunyun Pan, Shenzhen (CN); Dongfang Li, Shenzhen (CN); Xiaofei Mao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 305 days.

(21) Appl. No.: 17/784,989

(22) PCT Filed: Dec. 16, 2020

(86) PCT No.: PCT/CN2020/136905
§ 371 (c)(1),
(2) Date: Jun. 13, 2022

(87) PCT Pub. No.: WO2021/129491
PCT Pub. Date: Jul. 1, 2021

(65) Prior Publication Data
US 2023/0012137 A1    Jan. 12, 2023

(30) Foreign Application Priority Data

Dec. 25, 2019   (CN) .......................... 201911354606.4

(51) Int. Cl.
*G06K 9/00*    (2022.01)
*G06T 7/215*    (2017.01)
(Continued)

(52) U.S. Cl.
CPC .............. *G06V 20/53* (2022.01); *G06T 7/215* (2017.01); *G06V 10/74* (2022.01); *G06V 20/46* (2022.01);
(Continued)

(58) Field of Classification Search
CPC . G06T 2207/10016; G06T 2207/30196; G06T 2207/30241; G06T 7/215;
(Continued)

(56) References Cited

U.S. PATENT DOCUMENTS

2001/0008561 A1   7/2001   Paul et al.
2009/0290791 A1   11/2009  Holub et al.
(Continued)

FOREIGN PATENT DOCUMENTS

CN   105069408 A   11/2015
CN   107657232 A   2/2018
(Continued)

OTHER PUBLICATIONS

Machine translation of CN108629791B (Year: 2017).*
(Continued)

*Primary Examiner* — Hadi Akhavannik
(74) *Attorney, Agent, or Firm* — Morgan, Lewis & Bockius LLP

(57) ABSTRACT

Provided are a pedestrian search method, a server, and a storage medium. The pedestrian search method is described as follows: a pedestrian detection is performed on each segment of monitoring video to obtain multiple pedestrian tracks, where each pedestrian track of the multiple pedestrian tracks includes multiple video frame images of a same pedestrian; and pedestrian tracks belonging to the same pedestrian is determined according to video frame images in the multiple pedestrian tracks, and the pedestrian tracks of the same pedestrian are merged.

20 Claims, 5 Drawing Sheets

(51) Int. Cl.
    *G06V 10/74* (2022.01)
    *G06V 20/40* (2022.01)
    *G06V 20/52* (2022.01)
    *G06V 40/20* (2022.01)

(52) U.S. Cl.
    CPC .............. *G06V 20/52* (2022.01); *G06V 40/25* (2022.01); *G06V 2201/07* (2022.01)

(58) Field of Classification Search
    CPC ........ G06T 7/246; G06V 10/62; G06V 10/74; G06V 20/46; G06V 20/52; G06V 20/53; G06V 2201/07; G06V 40/25
    See application file for complete search history.

(56) References Cited

U.S. PATENT DOCUMENTS

| | | | |
|---|---|---|---|
| 2015/0146917 A1 | 5/2015 | Bernal et al. | |
| 2017/0225033 A1* | 8/2017 | Czaja | A43B 5/1616 |
| 2017/0238846 A1* | 8/2017 | Xu | G06V 40/23 |
| 2020/0042781 A1* | 2/2020 | Zuckerman | G06F 16/587 |
| 2020/0201688 A1 | 6/2020 | Wang | |

FOREIGN PATENT DOCUMENTS

| | | |
|---|---|---|
| CN | 108629791 A | 10/2018 |
| CN | 109711267 A | 5/2019 |

OTHER PUBLICATIONS

Cn108629791b (Year: 2017).*
International Search Report for Application No. PCT/CN2020/136905, dated Mar. 17, 2021, 4 pages including English translation.
Extended European Search Report for Application No. 20908249.4, dated Jan. 23, 2024, 10 pages.
Madden et al., "Tracking People across Disjoint Camera Views by an Illumination-Tolerant Appearance Representation", Machine Vision and Applications, vol. 18, No. 3-4, Mar. 21, 2007, pp. 233-247.
Alahi et al., "Cascade of descriptors to detect and track objects across any network of cameras", Computer Vision and Image Understanding, vol. 114, No. 6, Jun. 1, 2023, pp. 624-640.
Xie, Xiongcheng et al., "Research on ontology adaptive mapping method based on similarity synthesis", Journal of Guangxi Teachers Education University: Natural Science Edition, vol. 27, No. 4, Dec. 2010, Doi: 10.16601/j.cnki.issn 1001-8713.2010.01.017.
First Office Action in Chinese Application No. 201911354606.4 dated Dec. 20, 2024, 15 pages including translation.
First Search Report in Chinese Application No. 2019113546064 dated Dec. 18, 2024, 6 pages including translation.

* cited by examiner

PEDESTRIAN SEARCH METHOD, SERVER, AND STORAGE MEDIUM

CROSS-REFERENCES TO RELATED APPLICATIONS

This is a National Stage Application, filed under 35 U.S.C. 371, of International Patent Application No. PCT/CN2020/136905, filed on Dec. 16, 2020, which is based on and claims priority to Chinese Patent Application No. 201911354606.4 filed with the China National Intellectual Property Administration (CNIPA) on Dec. 25, 2019, disclosure of which is incorporated herein by reference in its entirety.

TECHNICAL FIELD

Embodiments of the present application relate to the field of computer technologies, in particular to a pedestrian search method, a server and a storage medium.

BACKGROUND

As people pay attention to public safety problems, the coverage range of a monitoring camera is wider and wider, whereby the explosive growth of video information is brought. Many departments rely on a video monitoring system to manage a jurisdiction, and pedestrians are the main monitoring and management objects. A current search method is mainly a manual search, for example, the criminal suspect is searched through a video monitoring system. That is, the appearing position of the criminal suspect is found from each monitoring video manually, or the appearing position of the criminal suspect may be found by firstly performing a pre-analysis through a video abstract tool and then performing a manual search.

The inventor finds that at least the following problems exist in the above search method. During a pedestrian search, videos collected by multiple monitoring cameras may need to be searched, a video related to a criminal suspect may have a volume of terabytes, it may take a long time to search manually. Although the pre-analysis may be performed through the video abstract tool and then the manual search may be performed, the workload can not be ignored. Therefore, the manual pedestrian search has a problem of low efficiency.

SUMMARY

An embodiment of the present application provides a pedestrian search method, the pedestrian search method includes the following: performing a pedestrian detection on each segment of monitoring video to obtain multiple pedestrian tracks, where each pedestrian track of the multiple pedestrian tracks includes multiple video frame images of a same pedestrian; and determining pedestrian tracks belonging to the same pedestrian according to video frame images in the multiple pedestrian tracks, and merging the pedestrian tracks of the same pedestrian.

An embodiment of the present application further provides a server. The server includes at least one processor, and a memory communicatively connected to the at least one processor. An instruction which may be executed by the at least one processor is stored in the memory, and the instruction is executed by the at least one processor, so that the at least one processor may perform the pedestrian search method described above.

An embodiment of the present application further provides a computer readable storage medium. The computer readable storage medium stores a computer program, and the computer program, when executed by a processor, implements the pedestrian search method described above.

BRIEF DESCRIPTION OF DRAWINGS

One or more embodiments are illustrative described by the pictures in the accompanying drawings which correspond to the one or more embodiments, these illustrative descriptions are not to be construed as limiting the embodiments, throughout the accompanying drawings, elements having the same reference numeral designations represent like elements, and the pictures of the accompanying drawings are not to be construed as limiting in scale unless otherwise specified.

DETAILED DESCRIPTION

In order to make the purposes, technical schemes and advantages of embodiments of the present application clearer, various embodiments of the present application will be described in detail below in conjunction with the accompanying drawings. However, it should be appreciated by those of ordinary skill in the art that in various embodiments of the present application, numerous technical details are set forth in order to enable the reader to better understand the present application. However, the technical scheme claimed in the present application can be implemented even without these technical details and various changes and modifications based on the following embodiments. The following divisions of the various embodiments are for convenience of description and are not to be construed as any limitation to the particular implementations of the present application, and the various embodiments may be incorporated and referenced to each other without non-contradiction.

Figure 1:
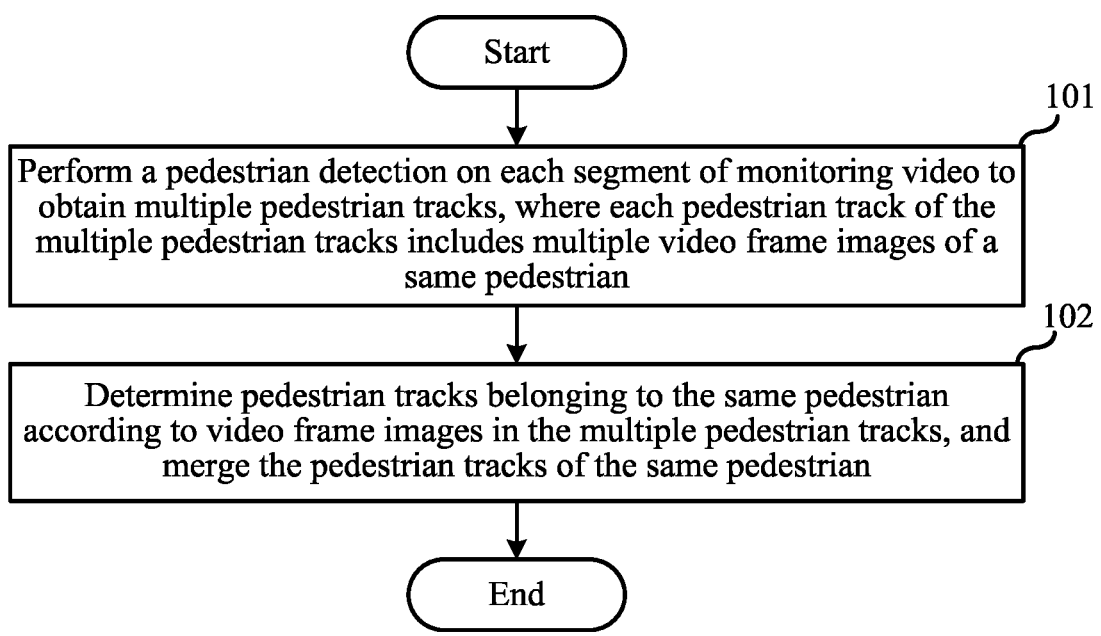
FIG. 1 is a flowchart of a pedestrian search method according to a first embodiment of the present application.

A first embodiment of the present application relates to a pedestrian search method. The pedestrian search method is applied to a pedestrian search system, and the pedestrian search system mainly includes three modules: a data extraction module, a data processing module and a data display module. The specific flow is shown in FIG. 1 and includes described below.

In 101, a pedestrian detection is performed on each segment of monitoring video to obtain multiple pedestrian tracks, where each pedestrian track of the multiple pedestrian tracks includes multiple video frame images of a same pedestrian.

In some embodiments, the data extraction module in the pedestrian search system performs a pedestrian identification on video frame images in each segment of monitoring video and performs a pedestrian tracking on the identified pedestrians, and multiple pedestrian tracks are obtained by utilizing a tracking algorithm. The data extraction module includes two sub-modules, i.e., a data acquisition module and a data analysis module. The data acquisition module is configured to acquire each segment of monitoring video, specifically, each segment of monitoring video acquired by a video monitoring device respectively installed in each region is transmitted to the data acquisition module. The transmission of the monitoring video may adopt a manner of shooting and transmitting in real time, or a manner of shooting firstly and then transmitting. Where each region may be a fixed region such as a community, a street and a shopping mall. The video monitoring device is an image acquisition device, such as a camera. Each segment of the shot monitoring video includes time information, position information and the like. It should be noted that each segment of monitoring video may be shot by multiple video monitoring devices respectively, or shot by one video monitoring device in different time periods. For example, there are two segments of monitoring videos, which may be obtained by shooting two video monitoring devices, respectively, or may be obtained by shooting one video monitoring device in two time periods, respectively.

The data analysis module is configured to independently analyze and process each segment of monitoring video. Firstly, the pedestrian identification is performed on video frame images in a monitoring video by firstly adopting a model such as a solid state disk (SSD), an RefineDET. It should be noted that all video frame images may be subjected to the pedestrian identification, and part of video frame images may also be subjected to the pedestrian identification; and then, the pedestrian tracking is performed according to a result of the pedestrian identification, multiple video frame images containing the same pedestrian is stored as one pedestrian track. Where the multiple video frame images may be stored as one pedestrian track according to a time sequence. It should be noted that if pedestrians cannot be identified in one of the video frame images due to a fact that the pedestrians are blocked, staggered and the like, a track breakage will be caused, and the pedestrians can not be identified in a current video frame image, then an image identification continues in a next video frame until a pedestrian is identified, the pedestrian tracking is performed. Thus, the same pedestrian may have multiple pedestrian tracks. Since the same pedestrian may include the multiple pedestrian tracks, and pedestrians may exist, multiple pedestrian tracks may be obtained. For example, if the number of video frame images of a segment of monitoring video is equal to 30, the pedestrian identification is performed on all video frame images. If the 1st to 10th video frame images contain a pedestrian A, the pedestrian A is not identified in the 11th to 14th video frame images, then the track breakage occurs, the 1st to 10th video frame images form a pedestrian track of the pedestrian A. If the 15th to 30th video frame images also contain the pedestrian A, then the 15th to 30th video frame images form a pedestrian track of another pedestrian A. If the 5th to 10th video frame images contain a pedestrian B and the pedestrian B is not identified in the other video frame images, then the 5th to 10th video frame images form a pedestrian track of the pedestrian B.

It is worth noting that when it is determined whether the video frame images contain the same pedestrian or not, feature data of each video frame image needs to be extracted, a similarity is calculated according to the feature data of every two video frame images, and the video frame images with the similarity satisfying the requirement are the video frame images containing the same pedestrian. For extraction of the feature data, feature data may be extracted from a video frame image through a common pedestrian re-identification network; or feature data is extracted from the video frame image by utilizing a pedestrian re-identification network with a shielding analysis, namely, multiple features of pedestrians extracted by the pedestrian re-identification network are combined with a pedestrian shielding module to analyze whether a shielding occurs. When the shielding occurs, a feature weight value of a shielding object part is reduced, a feature weight of an exposed part is increased, and the feature data after the weighted recombination of the multiple features is calculated. For the similarity calculation, Euclidean distance, cosine similarity, or the like may be used for calculation.

In one example, the video frame image may also be a cropped video frame image. Since pedestrian positions of all pedestrians in the video frame images and a bounding box containing the pedestrians may be identified by the pedestrian identification, the video frame image may be cut according to a bounding box by utilizing an image segmentation technology again to obtain a cut video frame image containing only one pedestrian.

In one example, since the difference between the video frame images of two consecutive frames is very small, if a large number of frames exist, an excessive heavy identification workload may be caused. Thus, a method of taking frames at intervals may be adopted, multiple video frame images are selected from each segment of monitoring video at intervals of a preset number of frame numbers, and the pedestrian identification is performed on the multiple video frame images. That is, two adjacent video frame images are separated by a preset number of frames, which may be set according to actual needs, and is not specifically limited in this embodiment. The pedestrian identification is performed on the multiple video frame images by adopting the model, and the pedestrian tracking is performed on the identified pedestrians to obtain multiple pedestrian tracks. For example: if a video frame of a segment of monitoring video has 30 frames, a preset number of frames at intervals is four frames, namely, the pedestrian recognition is respectively performed on the 1st, 5th, 10th, 15th, 20th, 25th and 30th video frame images of the monitoring video. If the 1st, 5th, 10th and 15th video frame images all contain the pedestrian A, then a pedestrian track of the pedestrian A is formed by the 1st, 5th, 10th and 15th video frame images; if the 10th, 15th, 20th, 25th and 30th video frame images all contain the pedestrian B, then a pedestrian track of the pedestrian B is formed by the 10th, 15th, 20th, 25th and 30th video frame images.

In one example, if the video frame image is a first frame, the pedestrian detection is performed on all positions of the video frame images; and if the video frame image is not the first frame, the pedestrian detection is performed on key positions of the video frame images, where the key positions are pre-estimated according to key positions in a last video frame image. The first frame is a first video frame image in a new pedestrian track, such as the 1st and 10th video frame images in the above example, all positions of the video frame images are detected; if the video frame image is not the first frame, since the pedestrian detection may obtain the pedestrian position information and a boundary box, and the pedestrian position including the pedestrian position is taken as the key position, the key position of the current video frame image may be estimated according to the key position of a previous video frame image. Thus, only the pedestrian detection is required for the key position of the video frame image. Therefore, a large amount of redundant pedestrian detection may be avoided, and the search efficiency is further improved.

In 102, pedestrian tracks belonging to the same pedestrian are determined according to video frame images in the multiple pedestrian tracks, and the pedestrian tracks of the same pedestrian are merged.

In some embodiments, since the multiple pedestrian tracks may correspond to different pedestrians, the data processing module needs to determine the pedestrian tracks belonging to the same pedestrian from the multiple pedestrian tracks and merge the pedestrian tracks of the same pedestrian according to a trajectory merging strategy. That is, if multiple pedestrian tracks of the same pedestrian exist, the multiple pedestrian tracks of the same pedestrian need to be merged into one pedestrian track, and all video frame images of the multiple pedestrian tracks of the same pedestrian are stored as one pedestrian track according to the time sequence.

It should be noted that the pedestrian search system further includes a data display module. The data display module is configured to output a pedestrian search result, so that a user can conveniently check the pedestrian search result, and the pedestrian search result includes position information and appearing time information of the pedestrian in the video.

In this embodiment, the pedestrian detection is automatically performed on each segment of monitoring video to obtain multiple pedestrian tracks; and the pedestrian tracks belonging to the same pedestrian is automatically determined according to the video frame images in the multiple pedestrian tracks, and the pedestrian tracks of the same pedestrian is automatically merged. The manual participation is not needed in the whole pedestrian search process, and the pedestrian search efficiency is improved.

A second embodiment of the present application relates to a pedestrian search method. This embodiment is roughly the same as the first embodiment, and the difference lies in that only a preset number of extracted video frame images are matched pairwise, and the pedestrian track belonging to the same pedestrian is determined according to the matching result; and the pedestrian tracks of the same pedestrian are merged to obtain the merged pedestrian track of the same pedestrian.

Figure 2:
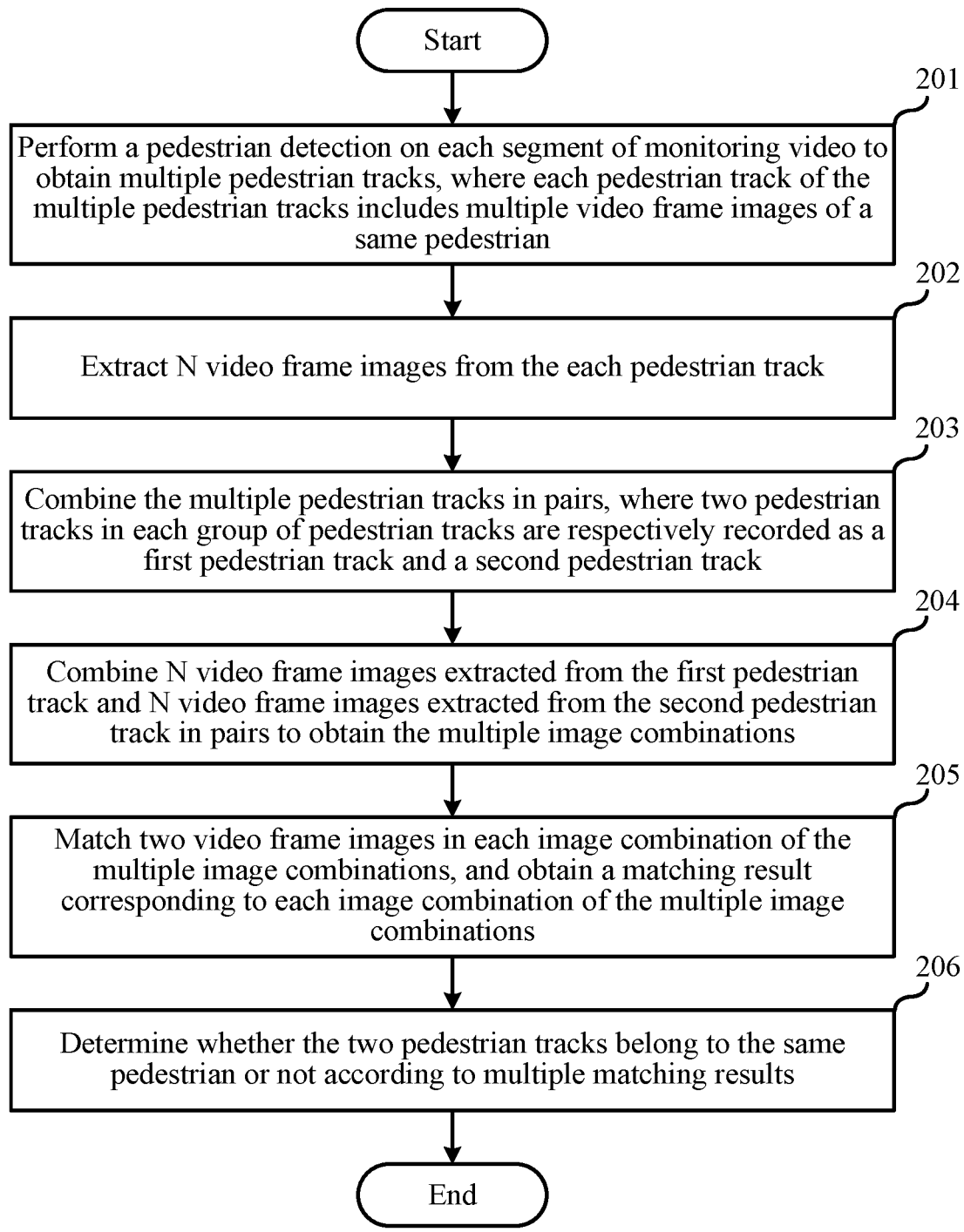
FIG. 2 is a flowchart of a pedestrian search method according to a second embodiment of the present application.

A flowchart of the pedestrian search method in this embodiment is shown in FIG. 2, and the method includes described below.

In 201, a pedestrian detection is performed on each segment of monitoring video to obtain multiple pedestrian tracks, where each pedestrian track of the multiple pedestrian tracks includes multiple video frame images of a same pedestrian. The 201 is similar to the 101 and will not be repeated here.

In 202, N video frame images are extracted from the each pedestrian track, where the two pedestrian tracks are respectively recorded as a first pedestrian track and a second pedestrian track.

Figure 3:
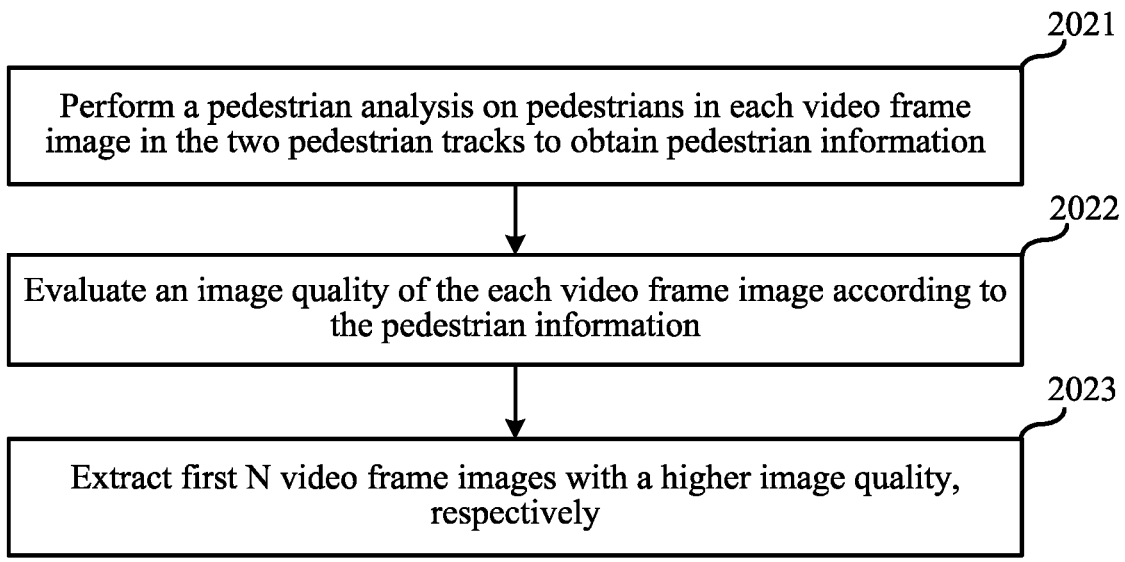
FIG. 3 is a flowchart of a specific implementation of a 202 according to a second embodiment of the present application.

In some embodiments, the data processing module extracts N video frame images from each pedestrian track, respectively. N video frame images may be extracted at will, N video frame images with good image quality may also be extracted, N is a positive integer and may be set according to needs, which is not specifically limited in this embodiment. In one example, a flowchart for extracting N video frame images from the each pedestrian track is shown in FIG. 3, and it includes described below.

In 2021, a pedestrian analysis is performed on pedestrians in each video frame image in the multiple pedestrian tracks to obtain pedestrian information.

In 2022, an image quality of the each video frame image is evaluated according to the pedestrian information.

In 2023, first N video frame images with a higher image quality are extracted, respectively.

In some embodiments, by utilizing a pedestrian quality analysis strategy, the data processing module evaluates the image quality of the video frame image according to the pedestrian information, and the pedestrian information may be information such as wearing, posture, hairstyle, and pedestrian articulation point of the pedestrian. The pedestrian information in this embodiment is pedestrian joint point information, that is, a pedestrian joint point detection is performed on pedestrians, and the image quality of the video frame image is evaluated according to a number of the detected pedestrian joint points. In one example, the first N video frame images with a higher image quality may be extracted from each pedestrian track in order of image quality, N video frame images are extracted from front to back if the image quality is ranked from high to low, and N video frame images are extracted from back to front if the image quality is ranked from low to high. According to the method, the video frame image with a high image quality is extracted, so that errors caused by low image quality may be reduced, the matching accuracy is improved, and thus the accuracy of the pedestrian search is further improved.

In 203, the multiple pedestrian tracks are combined in pairs, where two pedestrian tracks in each group of pedestrian tracks are respectively recorded as a first pedestrian track and a second pedestrian track.

In some embodiments, the multiple pedestrian tracks are combined in pairs, and whether every two pedestrian tracks belong to the pedestrian track of the same pedestrian is determined, whereby all pedestrian tracks belonging to the same pedestrian are determined.

For example, if four pedestrian tracks 1, 2, 3 and 4 exist, then there are 6 combinations of any two pedestrian tracks, any two pedestrian tracks may be tracks 1 and 2, tracks 1 and 3, tracks 1 and 4, tracks 2 and 3, tracks 2 and 4, and tracks 3 and 4, and N video frame images are extracted, respectively.

In 204, N video frame images extracted from the first pedestrian track and N video frame images extracted from the second pedestrian track are combined in pairs to obtain the multiple image combinations.

In some embodiments, the data processing module combines the N video frame images extracted from the first pedestrian track and the N video frame images extracted from the second pedestrian track in pairs to obtain multiple image combinations, and a number of multiple image combinations is equal to $N^2$. For example, the video frame images extracted from the first pedestrian track are A, B, C and D, the video frame images extracted from the second pedestrian track are a, b, c and d, and the combination in pairs means that A is combined with a, b, c and d, respectively, B is combined with a, b, c and d, respectively, C is combined with a, b, c and d, respectively, and D is combined with a, b, c and d, respectively, so that $4^2$ image combinations are obtained.

In one example, the N video frame images extracted from the first pedestrian track and the N video frame images extracted from the second pedestrian track may be combined one to one so as to obtain multiple image combinations, for example, video frame images in the first pedestrian track are A, B, C and D, and video frame images in the other pedestrian track are a, b, c and d, one of the one-to-one matching manners is to combine A with a, B with b, C with c, and D with d.

In 205, two video frame images in each image combination of the multiple image combinations are matched, and a matching result corresponding to each image combination of the multiple image combinations is obtained.

In some embodiments, a number of matching results is consistent with a number of multiple image combinations, that is, the number of matching results is also $N^2$. The matching result may include a matching or a non-matching, and may also include a similarity. In one example, when the matching result includes the similarity, different feature data may be extracted from the two video frame images in each image combination, and the similarity is calculated according to the feature data of every two video frame images. For the similarity calculation, the calculation may be performed using Euclidean distance, cosine similarity, and the like.

In one example, when the matching result includes the similarity, that two video frame images in each image combination are matched, and the matching result corresponding to each image combination is obtained, includes the following: feature data is extracted from the two video frame images in the each image combination of the multiple image combinations by utilizing a pedestrian re-identification network with a shielding analysis, respectively; and a similarity corresponding to each image combination of the multiple image combinations is obtained according to the feature data of each video frame image of the two video frame images. Feature data is extracted from the video frame image by utilizing a pedestrian re-identification network with the shielding analysis, that is, multiple features are extracted from the pedestrian re-identification network, such as human body position features; whether the shielding occurs or not is analyzed by combining with the pedestrian shielding module, when the shielding occurs, a feature weight value of a shielding object part is reduced, a feature weight of an exposed part is increased, and feature data obtained after multiple feature weights are recombined is calculated. According to the feature data of each video frame image, the similarity corresponding to each image combination is obtained, where the similarity may be calculated by utilizing an Euclidean distance or a cosine similarity and the like.

In 206, whether the two pedestrian tracks belong to the same pedestrian or not is determined according to multiple matching results.

In some embodiments, if the matching result is a matching or a mismatching, then whether the two pedestrian tracks belong to the same pedestrian or not may be determined according to a number of matching or mismatching, so that all pedestrian tracks belonging to the same pedestrian are determined.

Figure 4:
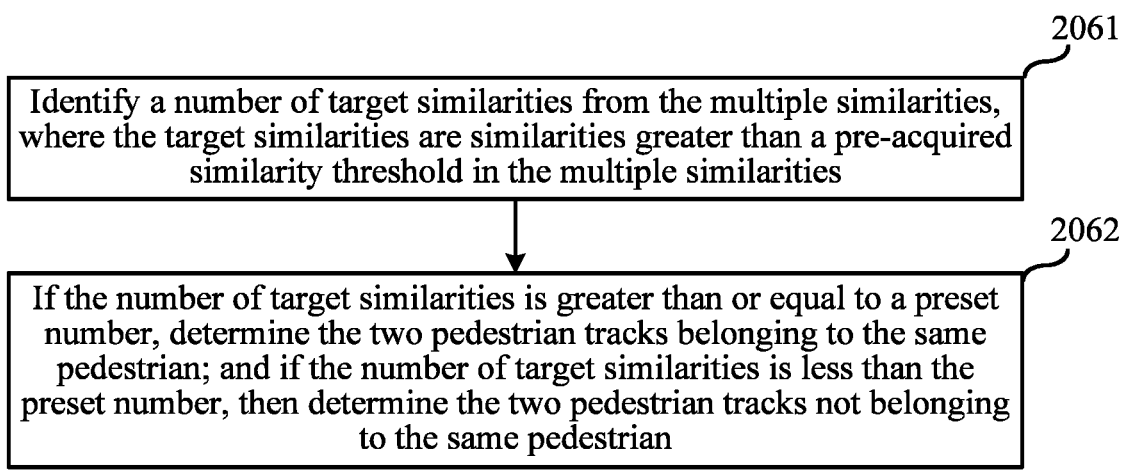
FIG. 4 is a flowchart of a specific implementation of a 206 according to the second embodiment of the present application.

In one example, if the matching result includes the similarity, a flowchart for determining whether two pedestrian tracks belong to the same pedestrian according to multiple matching results is shown in FIG. 4, and it includes described below.

In 2061, a number of target similarities are identified from the multiple similarities, where the target similarities are similarities greater than a pre-acquired similarity threshold in the multiple similarities.

In some embodiments, for example, the multiple similarities are 1, 2, 3, 4, 5, respectively, and the pre-acquired similarity threshold is 3, then the target similarities are 4, 5, and the number of target similarities is two.

In one example, the pre-acquired similarity threshold includes an adaptive similarity threshold, before the number of target similarities is identified from the multiple similarities, the method further includes the following: the multiple similarities are ranked; and one similarity is selected from the multiple similarities as the adaptive similarity threshold, where a difference value between the adaptive similarity threshold and a previous similarity of the adaptive similarity threshold and a difference value between the adaptive similarity threshold and a next similarity of the adaptive similarity threshold satisfy a preset condition. The ranking of the similarities may be ranked from small to large or from large to small, which is not particularly limited in this embodiment. For the $N^2$ similarities, if the similarity sequence is $\{S_1, S_2, S_3, \ldots, S_{N^2}\}$, and if one similarity $S_i$ satisfies a condition of $|S_{i+1}-S_i|>2|S_i-S_{i-1}|$, then $S_i$ is an adaptive similarity threshold. In one example, a condition that a minimum similarity value is greater than a preset threshold is satisfied, and the preset threshold is set according to actual needs. It is worth noting that no matter two pedestrian tracks come from two segments of monitoring videos, the two segments of monitoring videos are shot by different video monitoring devices; and if the two pedestrian tracks are from the same monitoring video, the influence of external factors may be reduced by utilizing the self-adaptive similarity threshold, the accuracy of the obtained matching number is improved, and the accuracy of the pedestrian search is further improved.

In one example, the two pedestrian tracks come from two segments of monitoring videos, and the two segments of monitoring videos are shot by different video monitoring devices. For two cross-lens pedestrian tracks, due to influences of illumination, visual angles, lens styles and the like, the difference between images is relatively large, if an adaptive threshold is adopted as a judgment basis, the difference between results is relatively large, the influence of external factors may be reduced by using the adaptive similarity threshold, the matching accuracy is improved, and thus the accuracy of the pedestrian search is further improved.

In one example, two pedestrian tracks are from a same segment of monitoring video, and the similarity threshold is preset and stored locally. If the two pedestrian tracks are from the same segment of monitoring video, a matching may be performed by utilizing a preset similarity threshold besides utilizing the self-adaptive similarity threshold. For two pedestrian tracks of a same lens, a preset similarity threshold may be used; in a case where the matching accuracy is not greatly affected, the processing burden is reduced as much as possible, the processing efficiency is improved, and thus the efficiency of the pedestrian search is further improved.

In 2062, if the number of target similarities is greater than or equal to a preset number, the two pedestrian tracks belonging to the same pedestrian is determined; and if the number of target similarities is less than the preset number, then the two pedestrian tracks not belonging to the same pedestrian is determined.

In some embodiments, the preset number may be set as required, which is not specifically limited in this application. For example, if a number of the similarities is equal to 16, the preset number is 10, and if the number of the target similarities is larger than or equal to 10, the two pedestrian tracks belonging to the same pedestrian is determined; and if the number of the target similarities is less than 10, then the two pedestrian tracks not belonging to the same pedestrian is determined.

In this embodiment, a specific implementation that only a certain number of video frame images in multiple pedestrian tracks need to be matched is provided, so that the calculation cost during matching is reduced, and thus the search efficiency is further improved.

A third embodiment of the present application relates to a pedestrian search method. This embodiment is substantially the same as the first embodiment, except that it includes: a first merging step and a second merging step; the first merging step includes: the pedestrian tracks belonging to the same pedestrian is determined according to video frame images in multiple pedestrian tracks obtained from a same segment of monitoring video, and the pedestrian tracks of the same pedestrian are merged. The second merging step includes: the pedestrian tracks belonging to the same pedestrian is determined according to video frame images in pedestrian tracks obtained after the first merging step is executed, and the pedestrian tracks of the same pedestrian are merged.

Figure 5:
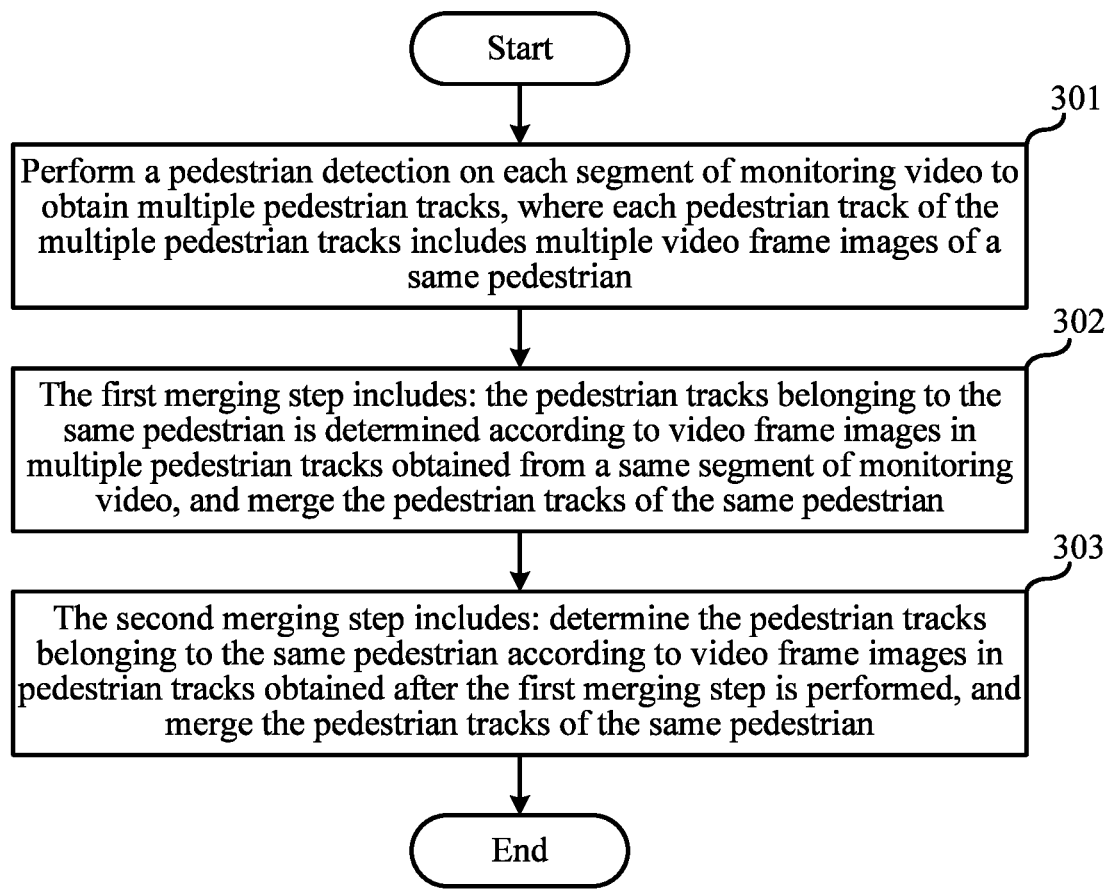
FIG. 5 is a flowchart of a pedestrian search method according to a third embodiment of the present application.

A flowchart of a pedestrian search method in this embodiment is shown in FIG. 5, and the method includes described below.

In 301, a pedestrian detection is performed on each segment of monitoring video to obtain multiple pedestrian tracks, where each pedestrian track of the multiple pedestrian tracks includes multiple video frame images of a same pedestrian.

The 301 is similar to the 101, which is not repeated here.

In 302, the first merging step includes: the pedestrian tracks belonging to the same pedestrian is determined according to video frame images in multiple pedestrian tracks obtained from a same segment of monitoring video, and the pedestrian tracks of the same pedestrian are merged.

In some embodiments, M video frame images are extracted from any two pedestrian tracks among multiple pedestrian tracks in the same segment of monitoring video, and M video frame images extracted from one pedestrian track and M video frame images extracted from another pedestrian track are combined in pairs to obtain multiple image combinations; two video frame images in each image combination are matched, and multiple matching results respectively corresponding to the multiple image combinations are obtained; and whether the two pedestrian tracks belonging to the same pedestrian or not is determined according to multiple matching results, and the pedestrian tracks of the same pedestrian in the same segment of monitoring video are merged, that is, only one pedestrian track is provided for the same pedestrian in the same segment of monitoring video. It should be noted that the M video frame images may be first M video frame images with a higher quality, for example, 2 segments of monitoring videos exist, one segment of monitoring video has 10 pedestrian tracks, each pedestrian track has 20 video frame images, and first 5 video frame images with a higher quality are selected, respectively; if 3 pedestrian tracks belonging to the pedestrian X, 4 pedestrian tracks belonging to the pedestrian Y and 3 pedestrian tracks belonging to the pedestrian Z are determined according to the matching result, then 3 pedestrian tracks obtained after the first merging step of this segment of monitoring video is executed exist. 12 pedestrian tracks exist in the other segment of monitoring video, 20 video frame images exist in each pedestrian track, and first 5 video frame images with a higher quality are selected, respectively; if 4 pedestrian tracks belonging to the pedestrian X, 3 pedestrian tracks belonging to the pedestrian Y and 3 pedestrian tracks belonging to the pedestrian Z are determined according to the matching result, then 3 pedestrian tracks obtained after the first merging step of this segment of monitoring video is performed exist. In 303, the second merging step includes: the pedestrian tracks belonging to the same pedestrian are determined according to video frame images in pedestrian tracks obtained after the first merging step is performed, and the pedestrian tracks of the same pedestrian are merged.

In some embodiments, according to the video frame images in the pedestrian tracks obtained after the first merging step is performed, L video frame images are respectively extracted from any two pedestrian tracks in the pedestrian tracks obtained after the first merging step is performed, and L video frame images extracted from one pedestrian track and L video frame images extracted from the other pedestrian track are combined in pairs to obtain multiple image combinations; two video frame images in each image combination are matched, and multiple matching results corresponding to the multiple image combinations are obtained; whether two pedestrian tracks belong to the same pedestrian is determined according to multiple matching results, the pedestrian tracks belonging to the same pedestrian is determined, and the pedestrian tracks of the same pedestrian are merged. That is, in a final pedestrian track, there is only one pedestrian track for the same pedestrian. It should be noted that the L video frame images may be the first L video frame images with a higher quality. For example, 6 pedestrian tracks obtained after the first merging step is performed exist, and the first 6 video frame images with a higher quality are selected, respectively, and video frame images in each pedestrian track are 60, 80, 60, 80, 60, and 60, respectively, which is equivalent to increasing the sample quantity of the video frame images, improving the quality of the selected first 6 video frame images with a higher quality, and facilitating that, in the second merging step, the pedestrian tracks belonging to the same pedestrian is determined according to the video frame images in the pedestrian tracks obtained after the first merging step is performed, and the pedestrian tracks of the same pedestrian are merged.

In one example, each segment of monitoring video is shot by different video monitoring devices. That is, the first merging step is to merge the pedestrian tracks of the same pedestrian from a same lens, and the second merging step is to merge the pedestrian tracks of the same pedestrian across the lens. Firstly, the pedestrian tracks of the same pedestrian in the same video monitoring device are merged, which is equivalent to increasing the sample size of the video frame image, so that the quality of a certain number of video frame images extracted from the video frame image is improved in the second merging step, which is conducive to the subsequent merging of the pedestrian tracks of the same pedestrian in different video monitoring devices.

In this embodiment, a specific implementation of merging the pedestrian tracks of the same pedestrian is provided.

A fourth embodiment of the present application relates to a pedestrian search method. This embodiment is substantially the same as the first embodiment, except that pedestrian tracks of a target pedestrian are detected.

Figure 6:
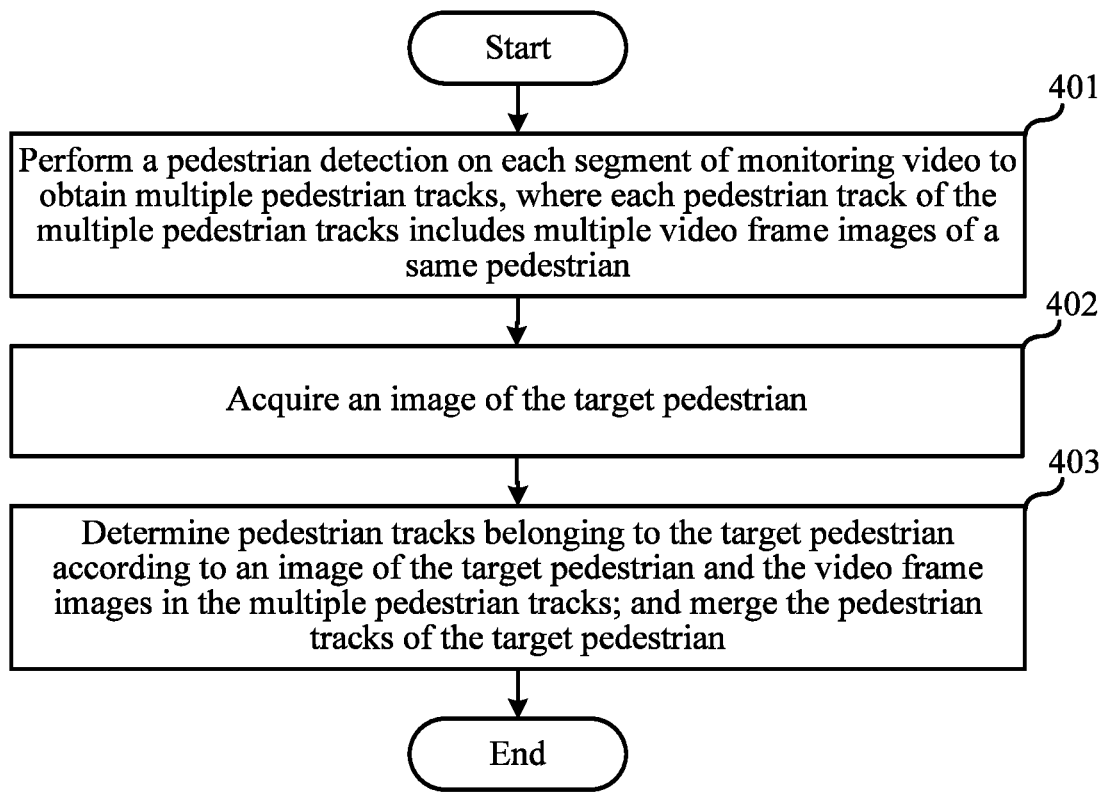
FIG. 6 is a flowchart of a pedestrian search method according to a fourth embodiment of the present application.

The flowchart of the pedestrian search method in this embodiment is shown in FIG. 6, and the method includes described below.

In 401, a pedestrian detection is performed on each segment of monitoring video to obtain multiple pedestrian tracks, where each pedestrian track of the multiple pedestrian tracks includes multiple video frame images of a same pedestrian.

In 402: an image of the target pedestrian is acquired.

In 403, pedestrian tracks belonging to the target pedestrian are determined according to an image of the target pedestrian and the video frame images in the multiple pedestrian tracks; and the pedestrian tracks of the target pedestrian are merged.

In an example, the image of the target pedestrian and the video frame images of the multiple pedestrian tracks are combined to obtain multiple image combinations, two images in each image combination are matched, and multiple matching results corresponding to the multiple image combinations are obtained; and whether the pedestrian tracks belong to the pedestrian tracks of the target pedestrian is determined according to the multiple matching results.

In one example, the pedestrian tracks belonging to the same pedestrian may be determined firstly, then one pedestrian track is extracted from the pedestrian track of the same pedestrian, and the video frame image of the extracted pedestrian track is matched with the image of the target pedestrian, and corresponding multiple matching results are obtained; and whether this pedestrian tracks are the pedestrian tracks of the target pedestrian is determined according to the multiple matching results.

It should be noted that the 402 may also be performed before the 401.

In this embodiment, a specific implementation of a target pedestrian search is provided.

The steps of the above methods are divided for clarity, and the steps, when being implemented, may be merged into one step, or some steps are split, and the steps are divided into multiple steps, so long as the same logical relationship is included, which is within the protection scope of the present patent. Insignificant modifications are added to algorithms or processes or insignificant designs are introduced without changing the core design of the algorithms and processes, which is within the protection scope of the present patent.

Figure 7:
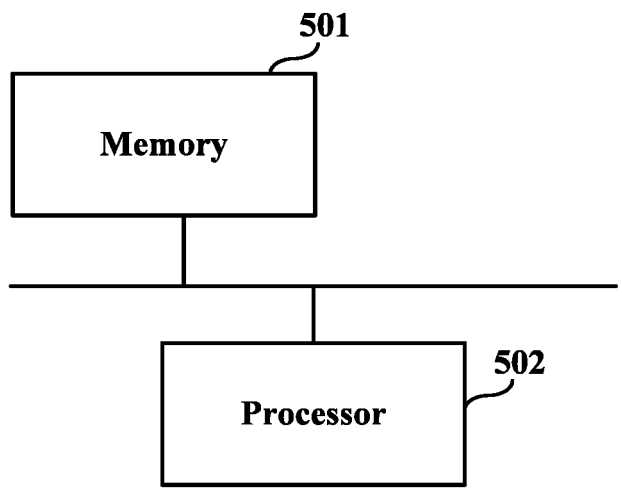
FIG. 7 is a structural diagram of a server according to a fifth embodiment of the present application.

As shown in FIG. 7, a fifth embodiment of the present application relates to a server. The server includes at least one processor 502 and a memory 501 communicatively connected to the at least one processor; the memory 501 stores an instruction executable by at least one processor 502, and the instruction, when being executed by the at least one processor 502, enables the at least one processor 502 to perform the pedestrian search method described above.

The memory 501 and the processor 502 are connected by a bus, the bus may include any number of interconnected buses and bridges, and the bus connects various circuits of one or more processors 502 and the memory 501. The bus may also connect a variety of other circuits such as peripherals, voltage regulators, and power management circuits, which are well known in this field and are therefore not further described herein. A bus interface provides an interface between the bus and the transceiver. The transceiver may be either one element or multiple elements, such as multiple receivers and transmitters, and may provide units for communicating with various other devices on a transmission medium. The data processed by the processor 502 is transmitted over a wireless medium through an antenna, in this embodiment, the antenna also receives the data and transmits the data to the processor 502.

The processor 502 manages the bus and general processing and also provides various functions, including timing, peripheral interfaces, voltage scaling, power management, and other control functions. The memory 501 may be configured to store data used by the processor 502 in performing operations.

A sixth embodiment of the present application relates to a computer-readable storage medium. The computer-readable storage medium stores a computer program, and the computer program, when executed by a processor, implements the method embodiments described above.

That is, it should be understood by those skilled in the art that all or part of the steps in the method according to the above embodiments may be implemented by a program instructing relevant hardware, this program is stored in a storage medium, the storage medium includes multiple instructions for causing an apparatus (may be a microcontroller, a chip, or the like), or a processor to perform all or part of the steps of the method described in various embodiments of the present application. The aforementioned storage medium includes: a U-disk, a removable hard disk, a read-only memory (ROM), a random access memory (RAM), a magnetic disk, or an optical disk, and various media capable of storing a program code.

It should be understood by those of ordinary skill in the art that the embodiments described above are specific embodiments for implementing this application, and that in practical application, various changes may be made to them in form and detail without departing from the spirit and scope of the present application.

What is claimed is:

1. A pedestrian search method, comprising:
performing a pedestrian detection on each segment of monitoring video to obtain a plurality of pedestrian tracks, wherein each pedestrian track of the plurality of pedestrian tracks comprises a plurality of video frame images of a same pedestrian; and
determining pedestrian tracks belonging to the same pedestrian according to video frame images in the plurality of pedestrian tracks, and merging the pedestrian tracks of the same pedestrian;
wherein the determining the pedestrian tracks belonging to the same pedestrian according to the video frame images in the plurality of pedestrian tracks comprises:
extracting N video frame images from the each pedestrian track;
combining the plurality of pedestrian tracks in pairs, wherein two pedestrian tracks in each group of pedestrian tracks are respectively recorded as a first pedestrian track and a second pedestrian track;
combining N video frame images extracted from the first pedestrian track and N video frame images extracted from the second pedestrian track in pairs to obtain a plurality of image combinations;
matching two video frame images in each image combination of the plurality of image combinations, and obtaining a matching result corresponding to each image combination of the plurality of image combinations; and
determining whether the two pedestrian tracks belong to the same pedestrian or not according to a plurality of matching results, and
wherein the plurality of matching results comprise a plurality of similarities; and
the matching the two video frame images in the each image combination of the plurality of image combinations, and the obtaining the matching result corresponding to the each image combination of the plurality of image combinations comprises:

extracting feature data from the two video frame images in the each image combination of the plurality of image combinations by utilizing a pedestrian re-identification network with a shielding analysis, respectively; and obtaining a similarity corresponding to each image combination of the plurality of image combinations according to the feature data of each video frame image of the two video frame images.

2. The pedestrian search method of claim 1, wherein the plurality of matching results comprise a plurality of similarities; and wherein the determining whether the two pedestrian tracks belong to the same pedestrian or not according to the plurality of matching results comprises:

identifying a number of target similarities from the plurality of similarities, wherein the target similarities are similarities greater than a pre-acquired similarity threshold in the plurality of similarities; and in a case where the number of target similarities is greater than or equal to a preset number, determining that the two pedestrian tracks belong to the same pedestrian; and in a case where the number of target similarities is less than the preset number, determining that the two pedestrian tracks do not belong to the same pedestrian.

3. The pedestrian search method of claim 2, wherein the similarity threshold comprises an adaptive similarity threshold;

wherein before the identifying the number of target similarities from the plurality of similarities, the method further comprises:

ranking the plurality of similarities; and selecting one similarity from the plurality of similarities as the adaptive similarity threshold, wherein a difference value between the adaptive similarity threshold and a previous similarity of the adaptive similarity threshold and a difference value between the adaptive similarity threshold and a next similarity of the adaptive similarity threshold satisfy a preset condition.

4. The pedestrian search method of claim 3, wherein the two pedestrian tracks are from two segments of monitoring videos, and the two segments of monitoring videos are captured and obtained by different video monitoring devices.

5. The pedestrian search method of claim 2, wherein the two pedestrian tracks are from a same segment of monitoring video, and the similarity threshold is preset and stored locally.

6. The pedestrian search method of claim 1, wherein the determining the pedestrian tracks belonging to the same pedestrian according to the video frame images in the plurality of pedestrian tracks, and the merging the pedestrian tracks of the same pedestrian comprises a first merging step and a second merging step;

the first merging step comprises: the determining the pedestrian tracks belonging to the same pedestrian according to video frame images in a plurality of pedestrian tracks obtained from a same segment of monitoring video, and the merging the pedestrian tracks of the same pedestrian; and the second merging step comprises: the determining the pedestrian tracks belonging to the same pedestrian according to video frame images in pedestrian tracks obtained after the first merging step is performed, and the merging the pedestrian tracks of the same pedestrian.

7. The pedestrian search method of claim 6, wherein each segment of monitoring videos is captured and obtained by different video monitoring devices.

8. The pedestrian search method of claim 1, wherein extracting the N video frame images from the each pedestrian track comprises:

performing a pedestrian analysis on pedestrians in each video frame image in the plurality of pedestrian tracks to obtain pedestrian information;

evaluating an image quality of the each video frame image according to the pedestrian information; and extracting first N video frame images with a higher image quality, respectively.

9. The pedestrian search method of claim 1, wherein performing the pedestrian detection on the each segment of monitoring video comprises:

in a case where a video frame image is a first frame, performing the pedestrian detection on all positions of the video frame image; and in a case where the video frame image is not the first frame, performing the pedestrian detection on key positions of the video frame image, wherein the key positions are pre-estimated according to key positions in a last video frame image.

10. The pedestrian search method of claim 1, wherein before the determining the pedestrian tracks belonging to the same pedestrian according to the video frame images in the plurality of pedestrian tracks, and the merging the pedestrian tracks of the same pedestrian, the method further comprises:

acquiring an image of a target pedestrian;

wherein the determining the pedestrian tracks belonging to the same pedestrian according to the video frame images in the plurality of pedestrian tracks, and the merging the pedestrian tracks of the same pedestrian comprises:

the determining pedestrian tracks belonging to the target pedestrian according to a video frame image of the target pedestrian and the video frame images in the plurality of pedestrian tracks; and the merging the pedestrian tracks of the target pedestrian.

11. A server, comprising:

at least one processor; and a memory communicatively connected to the at least one processor;

wherein the memory stores an instruction executable by the at least one processor, and the instruction, when executed by the at least one processor, causes the at least one processor to perform:

performing a pedestrian detection on each segment of monitoring video to obtain a plurality of pedestrian tracks, wherein each pedestrian track of the plurality of pedestrian tracks comprises a plurality of video frame images of a same pedestrian; and determining pedestrian tracks belonging to the same pedestrian according to video frame images in the plurality of pedestrian tracks, and merging the pedestrian tracks of the same pedestrian;

wherein the instruction, when executed by the at least one processor, causes the at least one processor to perform:

extracting N video frame images from the each pedestrian track;

combining the plurality of pedestrian tracks in pairs, wherein two pedestrian tracks in each group of pedestrian tracks are respectively recorded as a first pedestrian track and a second pedestrian track;

combining N video frame images extracted from the first pedestrian track and N video frame images extracted from the second pedestrian track in pairs to obtain a plurality of image combinations;

matching two video frame images in each image combination of the plurality of image combinations, and obtaining a matching result corresponding to each image combination of the plurality of image combinations; and determining whether the two pedestrian tracks belong to the same pedestrian or not according to a plurality of matching results, and wherein the plurality of matching results comprise a plurality of similarities; and the instruction, when executed by the at least one processor, causes the at least one processor to perform:

extracting feature data from the two video frame images in the each image combination of the plurality of image combinations by utilizing a pedestrian re-identification network with a shielding analysis, respectively; and obtaining a similarity corresponding to each image combination of the plurality of image combinations according to the feature data of each video frame image of the two video frame images.

12. A non-transitory computer-readable storage medium, storing a computer program, wherein the computer program, when executed by a processor, implements:

performing a pedestrian detection on each segment of monitoring video to obtain a plurality of pedestrian tracks, wherein each pedestrian track of the plurality of pedestrian tracks comprises a plurality of video frame images of a same pedestrian; and determining pedestrian tracks belonging to the same pedestrian according to video frame images in the plurality of pedestrian tracks, and merging the pedestrian tracks of the same pedestrian;

wherein the computer program, when executed by the processor, further implements:

extracting N video frame images from the each pedestrian track;

combining the plurality of pedestrian tracks in pairs, wherein two pedestrian tracks in each group of pedestrian tracks are respectively recorded as a first pedestrian track and a second pedestrian track;

combining N video frame images extracted from the first pedestrian track and N video frame images extracted from the second pedestrian track in pairs to obtain a plurality of image combinations;

matching two video frame images in each image combination of the plurality of image combinations, and obtaining a matching result corresponding to each image combination of the plurality of image combinations; and determining whether the two pedestrian tracks belong to the same pedestrian or not according to a plurality of matching results, and wherein the plurality of matching results comprise a plurality of similarities; and the computer program, when executed by the processor, further implements:

extracting feature data from the two video frame images in the each image combination of the plurality of image combinations by utilizing a pedestrian re-identification network with a shielding analysis, respectively; and obtaining a similarity corresponding to each image combination of the plurality of image combinations according to the feature data of each video frame image of the two video frame images.

13. The server of claim 11, wherein the plurality of matching results comprise a plurality of similarities; and wherein the determining whether the two pedestrian tracks belong to the same pedestrian or not according to the plurality of matching results comprises:

identifying a number of target similarities from the plurality of similarities, wherein the target similarities are similarities greater than a pre-acquired similarity threshold in the plurality of similarities; and in a case where the number of target similarities is greater than or equal to a preset number, determining that the two pedestrian tracks belong to the same pedestrian; and in a case where the number of target similarities is less than the preset number, determining that the two pedestrian tracks do not belong to the same pedestrian.

14. The server of claim 13, wherein the similarity threshold comprises an adaptive similarity threshold; and the instruction, when executed by the at least one processor, causes the at least one processor to perform the following:

before the identifying the number of target similarities from the plurality of similarities:

ranking the plurality of similarities; and selecting one similarity from the plurality of similarities as the adaptive similarity threshold, wherein a difference value between the adaptive similarity threshold and a previous similarity of the adaptive similarity threshold and a difference value between the adaptive similarity threshold and a next similarity of the adaptive similarity threshold satisfy a preset condition.

15. The server of claim 14, wherein the two pedestrian tracks are from two segments of monitoring videos, and the two segments of monitoring videos are captured and obtained by different video monitoring devices.

16. The server of claim 13, wherein the two pedestrian tracks are from a same segment of monitoring video, and the similarity threshold is preset and stored locally.

17. The server of claim 11, wherein the determining the pedestrian tracks belonging to the same pedestrian according to the video frame images in the plurality of pedestrian tracks, and the merging the pedestrian tracks of the same pedestrian comprises a first merging step and a second merging step;

the first merging step comprises: the determining the pedestrian tracks belonging to the same pedestrian according to video frame images in a plurality of pedestrian tracks obtained from a same segment of monitoring video, and the merging the pedestrian tracks of the same pedestrian; and the second merging step comprises: the determining the pedestrian tracks belonging to the same pedestrian according to video frame images in pedestrian tracks obtained after the first merging step is performed, and the merging the pedestrian tracks of the same pedestrian.

18. The server of claim 17, wherein each segment of monitoring videos is captured and obtained by different video monitoring devices.

19. The server of claim 11, wherein extracting the N video frame images from the each pedestrian track comprises:

performing a pedestrian analysis on pedestrians in each video frame image in the plurality of pedestrian tracks to obtain pedestrian information;

evaluating an image quality of the each video frame image according to the pedestrian information; and extracting first N video frame images with a higher image quality, respectively.

20. The server of claim 11, wherein performing the pedestrian detection on the each segment of monitoring video comprises:

in a case where a video frame image is a first frame, performing the pedestrian detection on all positions of the video frame image; and in a case where the video frame image is not the first frame, performing the pedestrian detection on key positions of the video frame image, wherein the key positions are pre-estimated according to key positions in a last video frame image.

* * * * *